3,087,916
TELOMERS OF QUINODIMETHANES AND
PREPARATION THEREOF
Billy F. Landrum and Horace R. Davis, Cedar Grove, and Louis A. Errede, Westfield, N.J., assignors, by mesne assignments, to Minnesota Mining and Manufacturing Company, St. Paul, Minn., a corporation of Delaware
No Drawing. Filed Apr. 19, 1956, Ser. No. 579,155
1 Claim. (Cl. 260—79)

This invention relates to novel telomeric compositions and to a method for the preparation thereof. In one aspect this invention relates to novel and useful aromatically unsaturated telomers having improved properties. In another aspect this invention relates to a new process for the preparation of novel telomers containing recurring aromatic nuclei, said telomers having improved molding properties. In still another aspect this invention relates to the production of new and valuable resinous waxes, high molecular weight waxes and thermoplastics which are particularly useful in the manufacture of solvent resistant articles and coating compositions.

It is known that polymers containing recurring aromatic nuclei, such as poly-p-xylylene have desirable properties which make them valuable as electrical element insulation and as protective coatings which have high heat stability and extraordinary resistance to corrosive liquids and excellent impermeability to common organic solvents. However, in spite of these desirable characteristics the homopolymer has been confined to somewhat limited application as a result of certain less desirable properties such as its non-flexibility, its high degree of insolubility in organic solvents and the difficulty in molding it except at very high temperatures ranging between about 350° C. and about 450° C.

It is believed that the difficulty in molding poly-p-xylylene is due to the high molecular weight resulting from crosslinking in the homopolymer. The crosslinking of the cyclic rings decreases the ability of the polymer to bend or flex. Thus, when poly-p-xylylene is molded at between about 350° C. and about 450° C. the resulting articles are very brittle.

It is therefore an object of the present invention to provide new and valuable polymers containing recurring aromatic nuclei which polymers have improved properties.

Another object of this invention is to provide new and valuable polymers which can be molded into a variety of useful, flexible end products at relatively low temperatures.

Another object of this invention is to provide a new and valuable telomer which is selectively soluble in certain organic solvents.

Another object of this invention is to provide a new and valuable telomer which can be applied as a protective coating in the form of a solution dispersion.

Another object is to provide a novel thermoplastic which is capable of producing clear moldings having excellent mechanical, electrical and abrasive properties.

Another object is to provide novel thermoplastics and resinous waxes having improved flow properties.

Another object of this invention is to provide a method for the manufacture of said improved polymeric or telomeric compositions.

Another object is to provide a process which is commercially feasible and economical for the preparation of telomers having the above mentioned desirable characteristics.

A further object is to provide a method for the preparation of a novel thermoplastic material, which process is characterized by the maximum utilization of the starting materials and minimum formation of by-products.

Various other objects and advantages of the present invention will become apparent to those skilled in the art from the accompanying description and disclosure.

According to this invention a quinodimethane is polymerized or telomerized in the presence of a sulfur-containing compound which compound functions as a chain transfer agent or telogen in the reaction. The preferred chain transfer agents or telogens employed in the present invention are organic sulfur-containing compounds. The preferred quinodimethanes used in accordance with this invention are 1,4-quinodimethane, 1,4-naphthaquinodimethane, corresponding heterocyclic 1,4-quinodimethane containing at least one heteronitrogen atom vicinal only to carbon atoms and the nuclear substitution products of the foregoing members with atoms of normally gaseous halogens and/or methyl groups. The process of this invention is preferably conducted at a temperature below about 30° C. to produce aromatic, sulfur-containing compounds having improved properties over the unmodified quinodimethane homopolymer, and having molecular weights between about 250 and about 250,000 or higher.

The quinodimethanes used in accordance with the present invention contain from 1 to 2 six-membered rings, one of said rings being diunsaturated and having each of 2 carbon atoms bonded to a carbon atom of an aliphatic group through a double bond. This latter type ring which is common to each of the quinodimethanes used as a monomer in the process of this invention is referred to herein as the quinoid ring. Although the two aliphatic groups which are doubly bonded to the diunsaturated or quinoid ring may be bonded to adjacent, i.e. ortho-positioned carbon atoms, of the ring, they are preferably bonded to carbon atoms of the ring which are in the para-position to one another. The preferred quinodimethanes of this invention are those having a symmetrically diunsaturated six-membered ring to which methylene groups are doubly bonded to each of two para-positioned carbon atoms, such as, for example, in p-quinodimethane which has the structure,

(1)

As indicated above, the term quinodimethane as used herein also includes those compounds having a quinoid ring fused to one or more aromatic rings. The quinodimethanes which contain a quinoid ring fused to one or more aromatic rings are preferably those in which the additional ring is a six-membered ring having aromatic unsaturation of the benzenoid or resonating type and which is fused to the quinoid ring such as, for example, in 1,4-naphthaquinodimethane which has the structure:

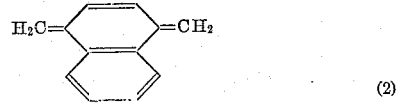

(2)

The aromatically unsaturated ring which is fused to the quinoid ring is referred to herein as the benzenoid ring.

It is to be understood that the quinodimethane starting material of this invention may be a carbocyclic compound, i.e. in which each atom of the basic ring structure is a carbon atom such as in 1,4-quinodimethane and 1,4-naphthaquinodimethane; or it may be a nitrogen-containing heterocyclic compound, i.e. a compound having at least one nitrogen atom as part of the cyclic nucleus. The heterocyclic compounds are preferably those in which the nitrogen is vicinal only to carbon and includes those in which nitrogen is a constituent of the quinoid ring or the benzenoid ring.

The groups which are bonded to the cyclic skeleton of the quinodimethane are referred to herein as the nuclear substituents and are any of the group consisting of hydrogen, normally gaseous halogens and halogenated or non-halogenated methyl radicals. These substituents of the dicyclic compounds may be on the quinoid ring or on the aromatically unsaturated ring or on both rings. Where more than one halogen is present, they may be either the same halogens or different halogens. Of the quinodimethanes which are substituted with methyl or halogen groups, those having not more than two methyl groups or halogens are preferred. The methylene group or groups to which the quinoid ring is attached may also be substituted with normally gaseous halogens and methyl groups without departing from the scope of this invention.

Exemplary of the preparation of quinodimethane starting materials which are reacted in accordance with the present invention is the pyrolysis of an aromatic compound of the group consisting of 1,4-xylene, 1,4-dimethyl naphthalene, corresponding heterocyclic dimethyl compounds having from 1 to 2 six-membered rings and containing at least one heteronitrogen which is vicinal only to carbon atoms, and the nuclear substitution products of the foregoing members with atoms of the normally gaseous halogens, halomethyl and additional methyl radicals at a temperature between about 700° C. and about 1300° C. and a total pressure not higher than about 400 mm. mercury for a period of not more than one second followed by quenching of the pyrolyzed vapors to a temperature which is preferably below about −45° C., preferably in a cold liquid or on a cold surface.

Among the specific carbocyclic aromatic compounds which can be pyrolyzed to produce the aforesaid quinodimethanes which are used as a reactant in accordance with the process of this invention are: p-xylene; pseudocumene; durene; isodurene; prehnitene; pentamethyl benzene; hexamethyl benzene; 1,4-dimethyl naphthalene; 1,2,3,4,6,7-hexamethyl naphthalene; 2-chloro-p-xylene; 2-fluoro-p-xylene; 2,5 - difluoro-p-xylene; 2,5-dichloro-p-xylene; 2,3,5-trichloro-p-xylene; 2,3,5-trifluoro-p-xylene; 2,3,5,6-tetrachloro-p-xylene; 2,3,5,6-tetrafluoro-p-xylene; 2-chloro-3,5,6-trimethyl benzene; 6-chloro-1,4-dimethyl naphthalene and 2,3,6,7-tetrachloro-1,4-dimethyl naphthalene. Among the specific aromatically unsaturated nitrogen-containing heterocyclic compounds which are pyrolyzed to yield the heterocyclic quinodimethanes which are reacted as described herein are: 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl quinazoline; 5,8-dimethyl quinoxaline; 2,3,5-trimethyl pyrazine; 2,3,5,6-tetramethyl pyrazine; 2,3,5-trimethyl pyridine; 2,4,5-trimethyl pyridine; 5,6,8-trimethyl quinoline and 2,5-dimethyl-6-pyrazine.

The pyrolysis of the aforesaid 1,4-dimethyl substituted aromatic compounds is preferably carried out at a temperature within the range of about 900° C. to about 1300° C., for example, at about 1000° C. For best results the aromatic compounds should be present in the vapor phase at a vapor pressure not substantially higher than 150 mm. mercury. Excellent results are obtained when the vapor pressure of the 1,4-dimethyl substituted aromatic compound is 10 mm. mercury or somewhat below, for example, about 5 mm. mercury. The pyrolysis can be conducted in the presence of an inert gas, such as carbon dioxide, steam or nitrogen, particularly when the partial pressure of the aromatic compound is 10 mm. mercury or below. In all cases the total pressure employed should be below 400 mm. mercury. Within the preferred pyrolysis temperature range the residence time should be within the range of from about 0.1 to about 0.001 second, however, a shorter or longer residence time can be used without departing from the scope of this invention.

The quinodimethanes thus formed tend to homopolymerize very quickly when in solution, at a temperature above about −45° C., in the absence or in the presence of an initiator such as, for example, acetyl peroxide. It has been found that in the absence of a polymerization initiator the quinodimethanes do not homopolymerize rapidly at a temperature below −45° C. The quinodimethane which forms during pyrolysis is rapidly quenched in a liquid for example, hexane which is maintained at a relatively low temperature, preferably below −45° C. The temperature at which the hot vapors are quenched depends on whether or not the quinodimethane thereby produced is to be stored over an extended period of time or whether the quinodimethane is to be used immediately as a monomer in accordance with the process of this invention. This is an important consideration since as indicated above, it has been found that the quinodimethanes form polymeric products at about room temperature and, in fact, they polymerize rapidly at temperatures above −45° C. Thus, when it is desired to store the quinodimethane in stable form until it is to be interacted with the sulfur-containing compound, the hot quinodimethane vapor obtained by the above pyrolysis reaction is quickly quenched and dissolved in a cold liquid maintained at a temperature below −45° C. and preferably at about −80° C. The resulting solution so prepared is stored until ready for use.

The liquid used for quenching and storing of the quinodimethane may be of any composition which remains liquid at the necessary temperature range and which has a relatively low partial pressure at about −45° C. consistent with the upper total pressure limit of 400 mm. mercury pressure and preferably low enough to permit operation below 10 mm. mercury. The liquid should also be substantially non-reactive with the quinodimethane formed and with the sulfur-containing compound of the reaction although liquids which react to some slight degree with the compounds may be used. Among the specific liquids which may be used are the paraffinic and cycloparaffinic hydrocarbons of low freezing point, such as hexane, petroleum ether, cyclopentene and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloroethyl benzene, o-fluorotoluene and 1,1-dichloroethane; a carbonyl compound of low freezing point such as acetone, methyl ethyl ketone and methyl isobutyl ketone; an ether of low freezing point, such as diethyl ether, ethyl n-propyl ether and tetrahydrofurane; an alcohol of low freezing point, such as methanol, ethanol and isopropyl alcohol; and other normally liquid compounds of low freezing point, such as carbon disulfide. If desired a liquid of low freezing point may be obtained by the blending of two or more compounds of higher freezing point. For example, a mixture of carbon tetrachloride and chloroform can be used.

A more detailed description concerning the preparation of the quinodimethane monomer starting material used in accordance with the present invention can be found in our prior copending application, Serial Number 386,106 filed on October 14, 1953, now U.S. Patent No. 2,777,005.

Suitable compounds which act as chain transfer agents when used in accordance with the present invention are the organic sulfur-containing compounds wherein a sulfur atom is bonded to a carbon atom and is additionally bonded to a hydrogen, halogen (F, Cl, Br, or I), or sulfur atom and inorganic sulfur-containing halides which contain not more than two oxygen atoms.

Illustrative of inorganic sulfur-containing halides which function as chain transfer agents in this invention are the thionyl halides such as for example, thionyl bromide; thionyl bromochloride; thionyl chloride; thionyl chlorofluoride, etc., sulfuryl halides such as for example, sulfuryl bromide; sulfuryl bromochloride; sulfuryl chloride; sulfuryl chlorofluoride, etc., and sulfur halides such as for example, sulfur monochloride; sulfur dichloride, etc. It is also within the scope of the present invention to employ hydrogen sulfide as a chain transfer agent in the reaction with quinodimethane.

The preferred chain transfer agents of this invention are the aforesaid organic sulfur-containing compounds wherein at least one sulfur atom is bonded to a hydrogen, halogen atom and is additionally bonded to a hydrogen, halogen or sulfur atom which compounds comprise acyclic, alicyclic and aromatic compounds containing from 1 to 100 carbon atoms. Illustrative of the above-defined organic chain transfer agents are the acyclic compounds such as the saturated and unsaturated mercaptans, for example, methyl mercaptan; ethyl mercaptan; propyl mercaptan; butyl mercaptan; allyl mercaptan and isomers and homologs thereof; the saturated and unsaturated disulfides for example, dimethyl sulfide; diethyl disulfide; methyl ethyl disulfide; methyl butyl disulfide; methyl allyl disulfide; vinyl ethyl disulfide and isomers and homologs thereof; and saturated and unsaturated sulfenyl halides for example, allyl sulfenyl chloride; butyl sulfenyl fluoride, methyl sulfenyl chloride; ethyl sulfenyl bromide and isomers and homologs thereof; alicyclic compounds such as, for example, cyclobutyl mercaptan; cyclohexenyl mercaptan; cyclohexyl mercaptan; dicyclobutyl disulfide; cyclohexyl hexyl disulfide; cyclobutyl sulfenyl chloride, isomers and homologs thereof; and aromatic compounds such as, for example, thiophenol; thiosalicyclic acid; p-xylylene mercaptan, etc.

The aforementioned aliphatic compounds may additionally contain such groups as those selected from the class comprising aryl, hydroxyl, carbonyl, carboxylic, nitro and amino groups and halogen atoms; the aforementioned aromatic compounds may additionally contain such radicals as those selected from the class comprising alkyl, hydroxyl, carbonyl groups and halogen atoms such as for example, dichloromethyl methyl disulfide; phenyl octyl sulfenyl chloride, methyl thiophenol; chlorothiophenol, etc.

Most particularly preferred of the aforesaid organic chain transfer agents are the substituted and non-substituted mono and polymercaptans, such as for example, trichloromethyl mercaptan; trichloroethyl mercaptan; bromomethyl mercaptan; methyl mercaptan; 2-methyl butyl mercaptan; ethyl mercaptan; octyl mercaptan; thiophenol; methyl thiophenol; dimercaptohydroquinone; dichlorodimercapto-hydroquinone; p-xylylene mercaptan, etc.

In accordance with the present invention the sulfur-containing chain transfer agent or telogen is reacted with a quinodimethane in a telomerization reaction at a mole ratio of between about 20:1 and about 0.001:1, preferably between about 10:1 and about 0.01:1. The chain length, and therefore the molecular weight, of the aromatic telomer product varies inversely with the amount of chain transfer agent employed in the reaction. Consequently, if it is desired to obtain a high molecular weight telomer, a chain transfer agent is used in amounts within the lower portion of the range set forth above. Conversely, if a low melocular weight telomer is desired, a chain transfer agent is employed within the higher portion of the range set forth above.

The telomerization of a quinodimethane with a sulfur-containing chain transfer agent to produce the novel aromatic telomers of the present invention is effected, in general, at temperatures below about 30° C., and preferably at a temperature below about −40° C. As temperatures increase above about 30° C. larger amounts of quinodimethane homopolymer are obtained as products of the reaction until the yield of telomer in proportion to homopolymer diminishes to such an extent that the telomerization reaction becomes insignificant. The novel aromatic telomers of this invention are prepared, therefore, by contacting a quinodimethane with any of the above described chain transfer agents, in an acceptable mole ratio at a temperature between about −100° C. and about 30° C., preferably between about −80° C. and about −40° C., which temperature may be as low as −120° C.

The temperature of the quinodimethane solution and the chain transfer agent may remain constant prior to and after contacting provided that the ingredients are maintained at the same temperature before addition. However, it is also permissible to introduce the chain transfer agent at a higher temperature than the quinodimethane solution provided that the overall reaction temperature after mixing does not exceed 30° C. This latter type of contacting wherein the quinodimethane solution is maintained at a temperature of between about −120° C. and about −40° C. and the telogen solution at a temperature of from about −80° C. up to the boiling point of its solvent is thus carried out at a "mixed" temperature under non-isothermal conditions.

Temperatures below about −40° C. are preferred in the telomerization reactions not only for the reason that homopolymerization of the quinodimethane is at a minimum but also because the molecular weight of the resulting telomers is more easily controlled. Generally, the higher the reaction temperature, the less the amount of chain transfer agent required to produce the desired telomer. The reaction may be so controlled that the entire polymerization is carried out at a temperature below −40° C. or the reaction mixture may be allowed to warm to a higher temperature such as 0° C. or 30° C., during the introduction of quinodimethane to chain transfer agent. Thus, the reaction may be carried out adiabatically or isothermically; however, isothermal conditions offer an approach to the formation of more predictable and uniform telomer compositions and are therefore more desirable.

The overall reaction period varies over relatively wide limits. The telomer product begins to form immediately and the telomerization may continue for a period up to about 48 hours or longer before it is complete, however, the telomerization is generally run for a period between about 0.5 and about 24 hours. As the concentration of the quinodimethane diminishes the reaction rate lessons correspondingly so that the greatest amount of telomer is usually formed within the first hour and smaller but additional quantities are collected during the 24 hour period. The rate of reaction is also dependent to some extent upon the temperature so that at temperatures within the upper limits of the above range, the telomerization may be completed within a few minutes while at the lower temperatures of the above range the copolymerization may not be complete before 24 hours or more has elapsed.

The telomerizations of the present invention are effected in the liquid phase wherein at least the quinodimethane, preferably both the quinodimethane and the sulfur-containing chain transfer agent are dissolved in a solvent or mixture of solvents. Particularly preferred is the telomerization wherein the quinodimethane and the chain transfer agent are dissolved in a mutual solvent. Any of the above-mentioned quinodimethane quenching liquids are suitable as mutual solvents in the telomerization reaction; however, non-polar solvents such as toluene, carbon disulfide, chlorobenzene, hexane and cyclobutane; and polar solvents, such as acetone, methyl ethyl ketone, ethyl acetate, methanol, diethyl ether, etc., are among those particularly preferred.

One of the alternate methods for carrying out the telomerization reaction comprises reacting a chain transfer agent in a solvent which is different from, but miscible with the solvent employed for the quinodimethane. The sulfur-containing chain transfer agents of the present invention are suitably dissolved in any of the liquids previously listed for quenching the quinodimethanes. However, most preferred of the chain transfer agent solvents are non-polar solvents such as benzene; toluene; xylene; ethylbenzene, etc. This procedure is advantageous when circumstances favor removal of the quinodimethane solvent in deference to another. This is accomplished by conducting the telomerization at "mixed" temperatures which enable the boiling point of the quinodimethane solvent to be reached during contacting or in the subsequent reaction between the quinodimethane and the chain transfer agent. However, it should not be required that a temperature in excess of about 30° C. be reached in order to initiate removal of the quinodimethane solvent. It is preferable in this case that a solvent for the quinodimethane be selected which boils below 0° C.

It is also within the scope of this invention to effect the telomerization at temperatures within the upper limits of the above range by bubbling a gaseous chain transfer agent, such as methyl mercaptan, through a solution of quinodimethane by means of a porous ceramic disk or the like. Another procedure involves spraying the quinodimethane solution as a mist into a reactor which contains the gaseous chain transfer agent, or pure liquid chain transfer agent.

It has been found that the telomerization reaction is more convenient to carry out and that better contact between the quinodimethane and the chain transfer agent is attained when the solution of the quinodimethane is added to the chain transfer agent with agitation. This order of addition results in shorter chain telomer products, since the telogen fragments which are brought into intimate contact with the quinodimethane have more opportunity to terminate the chain. However, if longer chain telomer products are desired the order of addition may be reversed.

Agitation which may be achieved by mechanical stirring with a reciprocating blade or a propeller, by shaking the reaction vessel, by the turbulence caused by bubbling gaseous telogen through the quinodimethane solution, or by any other convenient or known means, is helpful in promoting better contact between the reactants and is therefore recommended.

From the above description it should be obvious to those skilled in the art that the above described telomerization may be carried out either in a batchwise or in a continuous manner without departing from the scope of this invention.

Promoters may be used in the operation of this invention if so desired, hence small amounts in the order of between about 0.01 and about 1.0 mole percent based on quinodimethane of peroxide type promoters, such as trichloroacetyl peroxide, acetyl peroxide, benzoyl peroxide, etc., or trace amounts of oxygen may be employed to initiate the reaction.

The telomerization reactions of this invention are carried out at atmospheric pressure under conditions set forth above by contacting the quinodimethane and chain transfer agent in an open or closed reactor in the presence or absence of promoter. The reaction vessel may be composed of glass, metal such as stainless steel or any other suitable material such as, for example plastic and may be constructed as a bomb, an open reaction flask or a reactor which is equipped with a continuous feed and product takeoff for removal of telomer as soon as it is formed in the reaction. After the crude telomer product has been removed from the reactor as a solid, it is purified by a process of washing, filtering and drying or by any other convenient process of purification. The structure and composition of the aromatic telomer products is determined by percent composition analysis and infrared analysis.

The telomerization reaction between a quinodimethane and a sulfur-containing telogen herein described leads to the production of a novel aromatic telomer having a recurring substituted or unsubstituted aromatically unsaturated cyclic nucleus, two carbon atoms of which are each singly bonded to a substituted or unsubstituted methylene group and having terminal end groups formed by the dissociation of the organic or inorganic sulfur-containing chain transfer agent.

The organic sulfur-containing chain transfer agents wherein at least one sulfur atom is bonded to a carbon atom and is additionally bonded to a hydrogen, halogen or sulfur atom and the inorganic sulfur-containing halide chain transfer agents which contain not more than two oxygen atoms; dissociate into reactive fragments which attach themselves to the ends of the quinodimethane polymer chain, thus terminating said chain. Examples of chain transfer agents which dissociate into reactive moieties, A and B, are given below in Table 1.

TABLE 1

| Telogens | Formulae | A | B |
|---|---|---|---|
| Sulfur dihalide | $SX_2$ | SX | X |
| Mercaptan | RSH | RS | H |
| Organic disulfide | R—S—S—R | RS | SR |
| Sulfenyl halide | RSX | RS | X |

R = halogenated or unhalogenated organic radical
X = fluorine, chlorine, bromine or iodine The aromatic telomers of this invention are solid materials such as waxes and plastics and correspond to the formula $$A-(X_2C-Q-CX_2)_n-B \qquad (3)$$

wherein A and B are fragments derived from the corresponding sulfur-containing chain transfer agent; Q represents at least one aromatically unsaturated cyclic nucleus of the benzenoid type which may or may not be substituted with halogen atoms or alkyl groups; X is a hydrogen or halogen atom or a phenyl or alkyl group, however, it is to be understood that the two X units bonded to the carbon atom may be the same or different units and that no more than two of the X units in the molecule is a substituent other than hydrogen; and n is an integer from 2 to 10,000 or higher.

It is also to be understood that the reactive fragments of the chain transfer agent which terminate the quinodimethane polymer chain may not constitute the whole telogen molecule per se. For example, the telogen molecule may decompose to yield a gas in addition to the reactive fragments which terminate the chain.

The aromatic telomers represented by the following scheme and produced in accordance with this invention is the preferred telomer of the present invention.

$$A-(H_2C-Q-CH_2)_n-B \qquad (4)$$

wherein A and B are fragments derived from the corresponding sulfur-containing chain transfer agent; Q represents at least one aromatically unsaturated cyclic nucleus of the benzenoid type which contains not more than two substituents of the group comprising halogen atoms or alkyl groups and wherein two nuclear carbon atoms of said aromatically unsaturated cyclic nucleus are each singly bonded to the methylene groups in the above formula (#4) in the 1 and 4 position to each other; and n is an integer from about 2 to about 1,000.

The aromatic telomers of this invention can have molecular weights ranging between about 250 and about 2,000,000 or higher. The preferred aromatic telomers, however, have molecular weights ranging between about 250 and about 300,000. The lower molecular weight telomer products are more desirable since they contain less cross-linking and are therefore more easily processed.

The aromatically unsaturated cyclic nuclei designated as Q in the above formulae contains such modifications as are present in the quinodimethane starting materials, so that if 1,4-quinodimethane were used, said cyclic nucleus (Q) would be

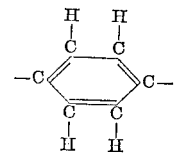

(5)

whereas if 1,4-naphthaquinodimethane were used, said cyclic nucleus (Q) would be

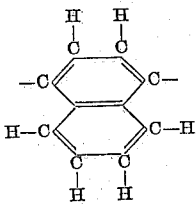
(6)

and if a 3-halo-1,4-quinodimethane were the starting material, said cyclic nucleus (Q) would be

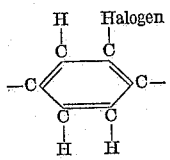
(7)

More specifically, Q in the above formula (#3) is an aromatically unsaturated cyclic nucleus containing at least one six-membered ring having aromatic unsaturation and is singly bonded at nuclear carbon atoms which are in the 1 and 4 position or 1 and 2 position to each other, the nuclear substitution of —Q— and methylene substitution being selected from the group consisting of normally gaseous halogens, hydrogens and methyl radicals. The —Q— radical is preferably selected from the group consisting of a benzene nucleus, a naphthalene nucleus and an aromatically unsaturated heterocyclic nucleus containing at least one heteronitrogen atom, the nitrogen atom or atoms being vicinal only to nuclear carbon atoms and the nuclear substitution of said nuclei and methylene substitution being as previously discussed above.

The following examples are offered as a better understanding of the present invention and are not to be construed as unnecessarily limiting to the scope of the present invention.

*Example 1*

A 1,4-quinodimethane solution (1.3 grams in 250 ccs. toluene at —80° C.) was added to 6.1 grams of thiophenol in 20 ccs. of toluene at —80° C. in a glass reaction flask. Over a period of 10 hours the solution was allowed to warm to room temperature and the insoluble telomeric material was removed by filtration and then extracted with hot xylene. The resulting insoluble material was removed by filtration, dried, and upon analysis, was shown to have a sulfur content of 1.51 percent and a softening point of from 240° C. to 300° C. (product A). This product was obtained in about 10 percent yield. The mother liquor was cooled to room temperature and the material which subsequently precipitated was removed by filtration, dried and, upon analysis, was found to have a sulfur content of 3.44 percent and a softening point of 185° C. to 235° C. (product B). This product was also obtained in about 10 percent yield.

The telomerization reaction proceeds according to the following equation

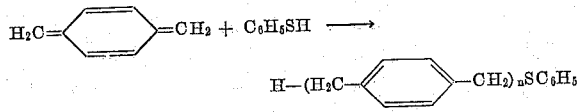

wherein n is 21 for product A and 9 for product B.

*Example 2*

A 1,4-quinodimethane solution (23 grams in 300 ccs. of acetone at —80° C.) was added to 160 grams of thiophenol in 40 ccs. of acetone at —80° C. in a glass flask. The solution was allowed to warm to room temperature over an 8 hour period and the insoluble telomeric material was removed by filtration and then extracted with hot xylene. The resulting insoluble material was removed by filtration, dried and the product (1.5 grams), upon analysis, was found to have a sulfur content of 1.52 percent and a softening point of from 210° C. to 300° C. (product A). The mother liquor was cooled to room temperature and the material which subsequently precipitated was removed by filtration, dried and the product (3 grams), upon analysis, was found to have a sulfur content of 4.06 percent and a softening point of from 180° C. to 230° C. (product B).

Product A contained 20 xylylene units per molecule and product B contained 7 xylylene units per molecule.

Products A and B in Examples 1 and 2 have approximately the same application (i.e., as protective wax coatings, plasticizers, etc.). It should be noted that in general the lower molecular weight products of this invention are more easily obtained at lower temperatures.

*Example 3*

A 1,4-quinodimethane solution (6 grams in 200 ccs. in toluene) was added to 1.0 gram of octyl mercaptan in 10 ccs. of toluene at —80° C. The solution was allowed to warm to room temperature in a glass flask. After about 5 hours of standing the insoluble telomeric material was removed by filtration and then extracted with xylene, filtered and dried. The aromatic telomer obtained (5.02 grams) had a softening point of 160° C.

*Example 4*

The telomeric product obtained in Example 3 above was placed in a mold and heated to a temperature of between 200° C. and 250° C. The pressure was raised to 8,000 pounds per square inch gauge and maintained for 10 minutes, during which time the granular telomer was converted into a completely fused mass which took the shape of the mold. The mold was then cooled, opened and the molded product was easily removed. Molded products of this type are useful as gaskets, O-rings, electrical insulators, buttons, disks, etc.

*Example 5*

A 1,4-quinodimethane solution (6 grams in 200 ccs. of toluene) was added to 0.1 gram of octyl mercaptan in toluene at —80° C. The solution was allowed to warm to room temperature and after about 7 hours of standing the insoluble telomeric material was removed from the glass flask by filtration, extracted with xylene, filtered again and dried. The aromatic telomer obtained (4.12 grams) had a softening point of from 225° C. to 230° C.

*Example 6*

Into a glass reactor which contained 0.01 gram of octyl mercaptan in toluene was added 6 grams of 1,4-quinodimethane solution at —80° C. The solution was allowed to warm to room temperature and, after about 7 hours' standing the insoluble telomeric material was removed by filtration. The solid was then extracted with xylylene, filtered again and dried.

The aromatic telomer obtained (3.88 grams) had a softening point of from 230° C. to 290° C.

*Example 7*

The telomer product obtained in Example 3 was pressed at 575° F., under 8,000 pounds per square inch gauge for a period of 5 minutes into a translucent rigid sheet having good strength properties and high resistance to organic solvents. These sheets find application as protective surfaces where their insolubility and mechanical properties are important.

*Example 8*

A portion of the telomer product obtained in Example 4 was pressed at 575° F., under 8,000 pounds per square inch gauge for a period of 5 minutes and the remaining portion of the telomer product was pressed at 575° F., under 15,000 pounds per square inch gauge for 30 minutes. Both pressings resulted in translucent rigid sheets having high strength properties and resistance to organic solvents.

*Example 9*

The telomer product obtained in Example 5 was pressed at 575° F., under 8,000 pounds per square inch gauge for a period of 5 minutes. The sample was an opaque white rigid sheet having good electrical, mechanical and abrasive properties thus making them suitable as a protective covering for metal surfaces such as copper, steel, aluminum, etc. The sheet can be glued to the surface with a suitable adhesive or can be pressed thereon by employing an elevated temperature and pressure.

*Example 10*

In a 6 ml. one-necked tube was placed 6.37 ml. (10.3 grams or 0.1 mole of sulfur dichloride). The tube was cooled with a Dry Ice-acetone bath and added to 500 ml. of 1,4-quinodimethane monomer in hexane, the concentration of which was 0.48 mole quinodimethane per liter of hexane. The operation was performed at −80° C. A white solid formed immediately and disappeared on standing overnight at −80° C. After about 16 hours there was formed an orange-yellow supernatant liquid and a tarry telomeric material which was soluble in chloroform. The orange-yellow liquid was distilled and the telomeric product was obtained in about 25 percent yield.

*Example 11*

Into a 600 ml. one-necked tube which contained 8 ml. (13.5 grams or 0.1 mole) of sulfur chloride was added 500 ml. of 1,4-quinodimethane monomer in hexane at a concentration of 0.48 mole per liter at −80° C. The solution was allowed to stand overnight at −80° C., after which the supernatant liquid was distilled off leaving a tarry telomeric material. The telomer was obtained in about 30 percent yield.

*Example 12*

In a glass three-necked round-bottomed flask 15 ml. of sulfuryl chloride was dissolved in 100 ccs. of toluene and 1000 ml. of 1,4-quinodimethane monomer solution was added. The mixture was stirred for 10 hours at −78° C. and then allowed to warm to room temperature. A solid was filtered off. The solid was insoluble in carbon tetrachloride, sodium hydroxide, hydrogen chloride, toluene, acetone, ethyl ether and Endowtherm-A. The solid contained sulfur in chlorine and softened at about 200° C. but did not melt below 300° C.

*Example 13*

A 1,2-quinodimethane solution (6 grams in n-hexane) is added to 1.0 gram of dimethyl disulfide in n-hexane at −60° C. The solution is allowed to warm to room temperature in a glass flask over a period of about 5 hours after which the insoluble telomeric material is removed by filtration and extracted with xylene. The resulting solution is then filtered and dried. The sulfur-containing telomer which is obtained in 60 percent yield is pressed at temperatures between 300° F. and 500° F. under 8,000 pounds per square inch gauge to a transparent, somewhat flexible sheet for use as a protective surface.

*Example 14*

A 1,4-naphthaquinodimethane solution (5 grams in toluene) is added to 1.0 gram of methyl sulfenyl chloride in toluene at −70° C. The solution is allowed to warm to room temperature in a glass flask over a period of about 10 hours after which the insoluble telomeric material is removed by filtration and extracted with xylene. The resulting solution is then filtered and dried. The sulfur-containing telomer which is obtained in 70 percent yield is pressed at temperatures between 200° F. and 500° F. under 15,000 pounds per square inch guage to a rigid opaque button.

*Example 15*

A 1,4-quinodimethane solution (5 grams in toluene) is added to 1.0 gram of thionyl chloride in toluene at −80° C. The solution is allowed to warm to room temperature in a glass bomb over a period of about 7 hours, after which the insoluble telomeric material is removed by filtration and then is extracted with xylene. The resulting solution is filtered and dried. The telomer which is obtained in 40 percent yield is pressed at about 400° F. to a transparent sheet suitable for protective coatings.

Other quinodimethanes and other chain transfer agents included within the scope of this invention may be similarly reacted in accordance with the procedure set forth in the above examples to produce novel telogens. For example, 5-chloro-o-quinodimethane, 1,4 - quino-α,α'-dichlorodimethane, 1,4-naphtha-3 - chloroquinodimethane, etc., may be reacted with any of the telogens previously discussed to produce the corresponding novel telomer.

The novel telomers of this invention are useful as waxes and plastic materials which are resistant to attack from various solvents. The telomer products may be molded at relatively low temperatures between about 150° C. and about 325° C. to provide thick films which are useful as protective surfaces and the like.

The telomeric mercaptans of this invention formed by the interaction between quinodimethane and hydrogen sulfide may be oxidized to sulfonic acids which are useful as synthetic detergents.

The aromatic telomer products of lower molecular weight can be applied to a surface as a protective coating in the form of a dispersion. Suitable solvents for said aromatic telomers are the non-polar solvents such as for example, xylene, toluene, benzene, hexane etc., or combinations thereof. The resulting dispersions may contain from about 20 to about 80 percent solids depending upon the desired thickness of the coat.

This invention relates to a process for the preparation of aromatic telomers which comprises telomerizing a quinodimethane with a sulfur-containing chain transfer agent at reduced temperature. The method for effecting the telomerization reaction may be any of the various procedures herein described, and various modifications and alterations of these procedures may become apparent to those skilled in the art without departing from the scope of this invention.

Having thus described our invention we claim:

The aromatic telomer containing at least one terminal sulfur-containing group obtained by polymerizing 1,4-quinodimethane in admixture with a mercaptan.

References Cited in the file of this patent

UNITED STATES PATENTS

| | | |
|---|---|---|
| 2,572,185 | Noether | Oct. 23, 1951 |
| 2,720,509 | Dees | Oct. 11, 1955 |
| 2,756,239 | Anderson | July 24, 1956 |
| 2,763,630 | Hubbard | Sept. 18, 1956 |